(No Model.)

L. A. RUST.
BICYCLE.

No. 353,380. Patented Nov. 30, 1886.

Witnesses
F. S. Ober
E. A. Rosenbaum

Inventor
Lucian A. Rust
By his Attorney
Wm. L. Rosenbaum

UNITED STATES PATENT OFFICE.

LUCIAN A. RUST, OF LOUDONVILLE, OHIO.

BICYCLE.

SPECIFICATION forming part of Letters Patent No. 353,380, dated November 30, 1886.

Application filed June 24, 1886. Serial No. 206,156. (No model.)

*To all whom it may concern:*

Be it known that I, LUCIAN A. RUST, a citizen of the United States, residing at Loudonville, in the county of Ashland and State of Ohio, have invented certain new and useful Improvements in Bicycles; and I do hereby declare the following to be a full, clear, and exact description of the invention, such as will enable others skilled in the art to which it appertains to make and use the same.

My invention relates to that class of bicycles known as the "upright;" and it consists in providing means whereby such a machine may be conveniently and quickly altered, so that it may be ridden with either wheel foremost.

In describing my invention I shall have reference to the ordinary type of bicycle—that is, one in which there is a great difference in the sizes of the wheels. It is obvious, however, that the invention may be applied to nearly all classes of bicycles without reference to the size of wheels.

Figure 1:
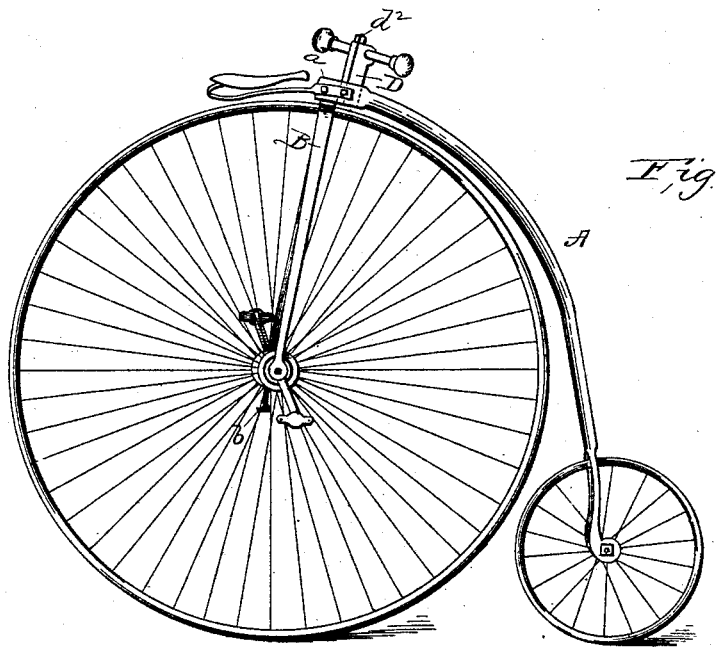
Figure 2:
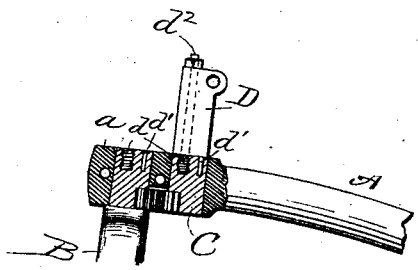

In the drawings, Figure 1 represents a side view, slightly in perspective, of a bicycle with the parts arranged for the machine to be driven with the little wheel foremost; and Fig. 2 is a detail sectional view of the "head."

A represents the "backbone," which has wrought upon its upper end, or otherwise secured thereto, a head, $a$. This head is provided with two borings, the rear one of which receives the joined upper end of the forks B, and the forward one receives and supports a short upright shaft, C. At the lower end and on its rear face this shaft is provided with a segment of gear, which meshes with a similar segment on the upper end of the forks.

The upper ends of the shaft C and the forks are flush with the upper face of the head, and each of them is provided with a threaded hole, $d$, and a smaller hole, $d'$. I have provided a removable piece, D, which carries the socket for the handle-bar. This piece is bored vertically to receive a heavy bolt, $d^2$, which screws into either of the holes $d$. The bottom of the piece D has a downwardly-projecting pin, which fits into either of the holes $d'$. By means of the bolt and pin the piece D is securely fastened to the top of the forks or the shaft C.

When the machine is arranged as shown in Fig. 1, it is operated as follows: The mount is made from a step, $b$, at the hub. The rider, when in the saddle, is directly over the hubs of the crank-wheel, and thereby is enabled to utilize a maximum of his weight in propelling the machine. By means of the supplemental shaft C and the gear-segments the rider is enabled to turn the machine in the same direction as he gives to the handles for guiding. Thus a motion of the handle to the right throws the rear wheel to the left and causes the machine to turn to the right, and vice versa.

The principal advantage in an upright machine constructed as herein described is in its safety, it being nearly impossible for the rider to be precipitated forward.

When rough roads are encountered, it takes but a few moments to make the change from old style to new, thus enabling the rider to proceed in safety.

Having described my invention, what I claim is—

1. In a bicycle, the combination of a reversible saddle and a reversible steering-gear, as set forth.

2. In a bicycle, means for adjusting the seat for riding with either wheel foremost, in combination with mechanism for adjusting the steering apparatus for riding in a corresponding direction, as described.

3. In combination with the forks or standards B, the head $a$, shaft C, and an adjustable piece carrying the handle-bar and adapted to be applied either to the shaft C or the standard, substantially as and for the purposes set forth.

4. In combination with the standard B, head $a$, shaft C, and adjustable piece carrying the handle-bar, the detachable saddle adapted to be reversed in position, substantially as set forth and described.

In testimony whereof I affix my signature in presence of two witnesses.

LUCIAN A. RUST.

Witnesses:
S. LOSH,
W. P. ULLMAN.